United States Patent
Oroskar et al.

(10) Patent No.: US 9,986,487 B1
(45) Date of Patent: May 29, 2018

(54) RELAY CONTROL SYSTEM NOTIFICATION OF INTER-CELL INTERFERENCE COORDINATION (ICIC) TO A DONOR BASE STATION

(71) Applicant: Sprint Communications Company L.P., Overland Park, KS (US)

(72) Inventors: Siddharth Oroskar, Overland Park, KS (US); Jasinder Pal Singh, Olathe, KS (US); Nitesh Manchanda, Overland Park, KS (US); Vanil Parihar, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 117 days.

(21) Appl. No.: 15/153,925

(22) Filed: May 13, 2016

(51) Int. Cl.
*H04W 40/22* (2009.01)
*H04W 28/02* (2009.01)

(52) U.S. Cl.
CPC ....... *H04W 40/22* (2013.01); *H04W 28/0236* (2013.01)

(58) Field of Classification Search
None
See application file for complete search history.

(56) References Cited

U.S. PATENT DOCUMENTS

| 8,543,123 | B2 | 9/2013 | Moon et al. |
| 9,179,468 | B2 * | 11/2015 | Kim ....................... H04J 11/005 |
| 2011/0136494 | A1 | 6/2011 | Kim et al. |
| 2012/0087276 | A1 | 4/2012 | Huang et al. |
| 2013/0005375 | A1 | 1/2013 | Chen |
| 2013/0252626 | A1 * | 9/2013 | Lee ..................... H04W 72/1231 455/452.1 |
| 2014/0016591 | A1 * | 1/2014 | Kim ....................... H04J 11/005 370/329 |
| 2014/0056244 | A1 | 2/2014 | Frenne et al. |
| 2014/0213274 | A1 | 7/2014 | Weber et al. |
| 2014/0269332 | A1 | 9/2014 | Senarath et al. |
| 2015/0222304 | A1 * | 8/2015 | Xu ....................... H04B 1/0475 370/329 |

FOREIGN PATENT DOCUMENTS

| CN | 102668659 | 9/2012 |
| WO | 2015072902 | 5/2015 |

* cited by examiner

*Primary Examiner* — Brian Roberts (57) ABSTRACT

A donor base station in a wireless communication network exchanges first user data with a wireless relay using a standard communication throughput. A relay control system in the wireless communication network exchanges data with the wireless relay over the donor base station and the neighboring base station. The relay control system detects Inter-Cell Interference Coordination (ICIC) between the wireless relay and the neighboring base station and in response, the relay control system identifies the donor base station serving the wireless relay and signaling the donor base station of the ICIC between the wireless relay and the neighboring base station. The donor base station receives the signaling and reduces the standard communication throughput of the wireless relay. The donor base station then exchanges second user data with the wireless relay using the reduced communication throughput.

20 Claims, 8 Drawing Sheets

RELAY CONTROL SYSTEM NOTIFICATION OF INTER-CELL INTERFERENCE COORDINATION (ICIC) TO A DONOR BASE STATION

TECHNICAL BACKGROUND

Wireless communication systems transfer data packets between User Equipment (UE) to provide data communication services, like internet access, media streaming, and user messaging. Wireless communication systems allow users to move about and communicate over the air with access communication. Communication services include voice calls, data exchange, web pages, streaming media, or text messages, among other communication services.

To expand or enhance the wireless signal coverage of a wireless communication network, wireless communication relays may be added to locations not adequately covered by current network infrastructure. A relay repeats wireless signals exchanged between wireless devices and a wireless network access point. Without the signal repetition provided by the wireless relay, the coverage area of the wireless network access point may otherwise have not extended far enough to serve the wireless devices using the relay. Thus, a wireless relay provides a less resource intensive means for increasing wireless network coverage. Relay nodes typically backhaul traffic through a wireless link to a donor base station.

Some wireless communication networks and devices use Orthogonal Frequency Division Multiplexing (OFDM) to exchange wireless data. In OFDM communication systems, a transmission bandwidth may be divided into subcarrier frequency channels and time slots creating resource blocks which may be allocated to a user for data transmissions. Allocating a user resource blocks with a distinct subcarrier frequency and time slot allows multiple users to more efficiency transmit and receive data from a network with minimal interference to other users.

Inter-Cell Interference Coordination (ICIC) may be used to coordinate resource block allocations among neighboring cells to mitigate the effects of inter-cell interference. Inter-cell interference may impact UEs at cell edges. This issue may be even more complicated when a macrocell is overlapped by a small cell, such as a relay node. Using ICIC, the interference issues resulting from an adjacent cell may be reduced by splitting frequency ranges, varying power levels, turning on positive cell selection offsets, and synchronizing scheduling and blank sub-frames.

A donor base station is typically not aware of the use of ICIC between the wireless relay and the neighboring base station. This ICIC usage between the neighboring base station and the wireless relay may impact the capacity of the donor base station as resource blocks used between the neighboring base station and the wireless relay cannot be used by the donor base station. Since the donor base station is not aware of the ICIC usage, it will continue to transmit the same amount of data and signaling to the wireless relay as when the ICIC usage was not enabled. Unfortunately, this may result in an overflow of data and higher re-transmission rates.

Technical Overview

A donor base station in a wireless communication network exchanges first user data with a wireless relay using a standard communication throughput. A relay control system in the wireless communication network exchanges data with the wireless relay over the donor base station and the neighboring base station. The relay control system detects Inter-Cell Interference Coordination (ICIC) between the wireless relay and the neighboring base station and in response, the relay control system identifies the donor base station serving the wireless relay and signaling the donor base station of the ICIC between the wireless relay and the neighboring base station. The donor base station receives the signaling and reduces the standard communication throughput of the wireless relay. The donor base station then exchanges second user data with the wireless relay using the reduced communication throughput.

DETAILED DESCRIPTION

Figure 1:
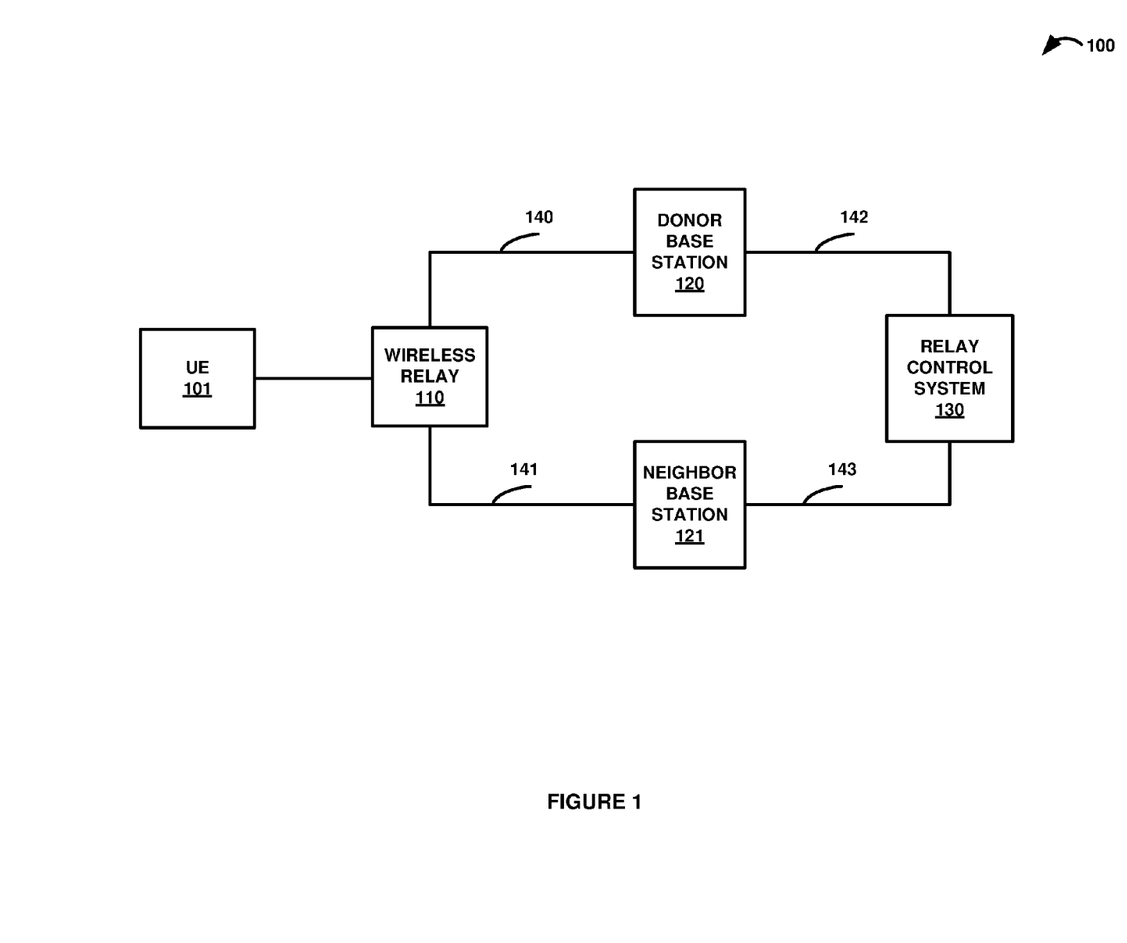
FIGS. 1-3 illustrate a wireless communication system to notify a donor base station of the use of Inter-Cell Interference Coordination (ICIC) between a wireless relay and a neighboring base station.
Figure 2:
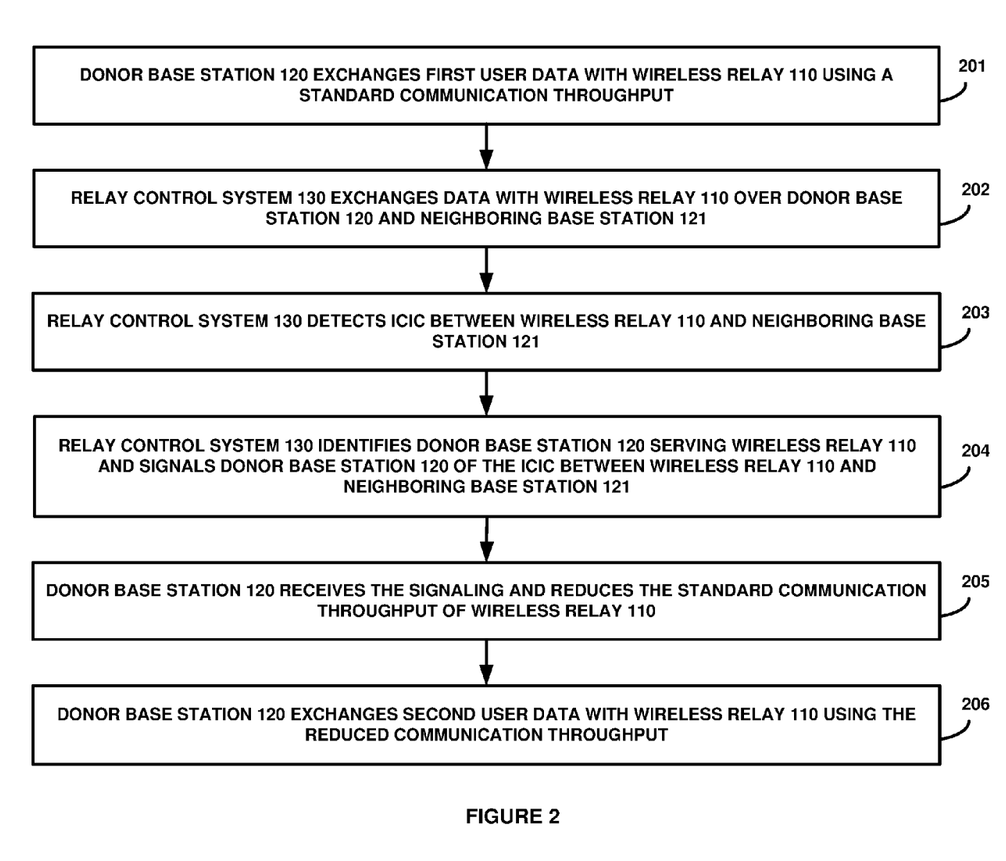
Figure 3:
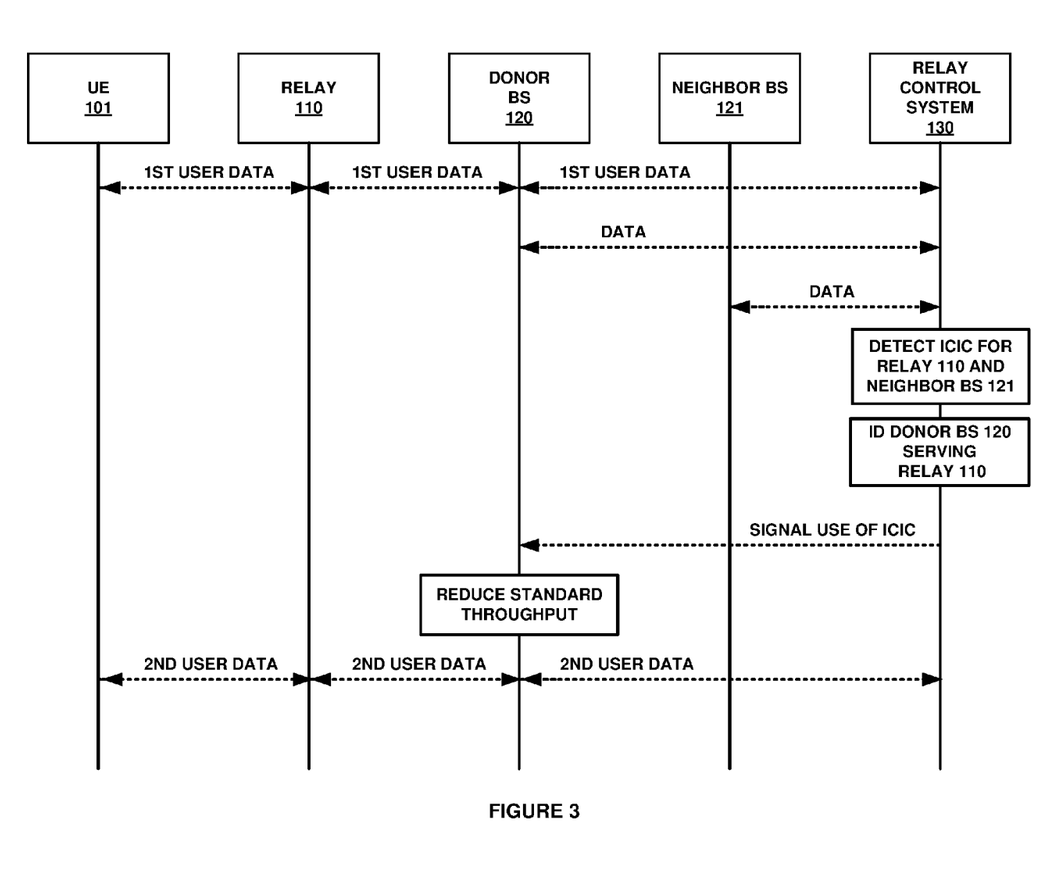

FIGS. 1-3 illustrate wireless communication system 100 to notify a donor base station of the use of Inter-Cell Interference Coordination (ICIC) between a wireless relay and a neighboring base station. Referring to FIG. 1, wireless communication system 100 comprises User Equipment (UE) 101, wireless relay 110, donor base station 120, neighboring base station 121, and relay control system 130. Wireless relay 110 communicates with donor base station 120 and neighboring base station 121 over signaling links 140-141. Donor base station 120 and neighboring base station 121 communicate with relay control system 130 over communication links 142-143.

In operation, donor base station 120 exchanges first user data with wireless relay 110 using a standard communication throughput. First user data may include wireless relay 110 transferring an attach request to donor base station 120, and in response to the request, donor base station 120 may provide wireless resources to wireless relay 110. Donor base station 120 may then transfer a relay attach message to relay control system 130 or other communication network elements indicating that wireless relay 110 is being served by donor base station 120. UE 101 may then attach to and register with wireless relay 110 which permits wireless relay 110 to provide wireless signaling from a communication network to UE 101 over donor base station 120. This wireless signaling to UE 101 may comprise Long Term Evolution (LTE) signaling, LTE Wireless Aggregation (LWA) signaling, or any other similar wireless communication format signaling.

A standard communication throughput may be a rate of successful data delivery over a communication channel. The standard communication throughput may be measured using bits per second, data packets per second, data packets per time slot, or some other communication throughout data delivery rate in a network. In some examples, the standard communication throughput may comprise of an allocated resource block region designated for wireless communications between donor base station 120 and wireless relay 110. The allocated resource block region may comprise a frequency range or a time slot range.

Relay control system 130 exchanges data with wireless relay 110 over donor base station 120 and neighboring base station 121. Relay control system 130 may exchange data with wireless relay 110 over donor base station 120 and neighboring base station 121 to initiate and establish a media service session for UE 101. The media service session may be a voice call, video streaming, real-time gaming, and the like. In some examples, relay control system 130 may exchange data with multiple wireless relays over multiple base stations.

Relay control system 130 may exchange X2 data between donor base station 120 and neighboring base station 121 over an X2 interface. Relay control system 130 may also exchange data between donor base station 120 and neighboring base station 121 over an S1-Relay Control System (S1-RCS) interface. It should be noted that although FIG. 1 shows relay control system 130 exchanging data with donor base station 120 and neighboring base station 121 over direct links, relay control system 130 may also exchange data with donor base station 120 and neighboring base station 121 over additional communication links and network elements, such as a Serving Gateway (S-GW), a Packet Data Network Gateway (P-GW), a Mobility Management Entity (MME), and other communication network elements—including combinations thereof.

In a next operation, relay control system 130 detects ICIC between wireless relay 110 and neighboring base station 121. ICIC may be used to coordinate resource block allocations among neighboring cells to mitigate the effects of inter-cell interference. Inter-cell interference may impact UEs at cell edges, such as a cell edge between donor base station 120 and neighboring base station 121. This issue may be even more complicated when a macrocell is overlapped by a small cell, such as a relay, femtocell, picocell, or some other type of small cell. Using ICIC, the interference issues resulting from an adjacent cell may be reduced by splitting frequency ranges, varying power levels, turning on positive cell selection offsets, and synchronizing scheduling time slots.

ICIC is typically performed by transmission of messages across a standardized backhaul interface, such as X2. Therefore, relay control system 130 may detect ICIC between wireless relay 110 and neighboring base station 121 by scanning for ICIC messages on an X2 interface. Relay control system 130 may also detect ICIC between wireless relay 110 and neighboring base station 121 by scanning for relay to base station addressing in ICIC messaging on an X2 interface. The ICIC messages may contain a bitmap indicating scheduling decisions, an overload indicator, or a high interference indicator.

Relay control system 130 identifies donor base station 120 serving wireless relay 110 and signals donor base station 120 of the ICIC between wireless relay 110 and neighboring base station 121. Relay control system 130 may also determine if donor base station 120 serving wireless relay 110 is the same as neighbor base station 121. In some examples, relay control system 130 signals donor base station 120 of the ICIC between wireless relay 110 and neighboring base station 121 if relay control system 130 determines that donor base station 120 serving wireless relay 110 is not the same as neighbor base station 121. Relay control system 130 may signal donor base station 120 over an X2 interface between relay control system 130 and donor base station 120. In other examples, relay control system 130 may signal donor base station 120 over an S1-RCS interface between relay control system 130 and donor base station 120.

Donor base station 120 receives the signaling and reduces the standard communication throughput of wireless relay 110. Donor base station 120 may reduce the standard communication throughput of wireless relay 110 by transferring an instruction to wireless relay 110 indicating a modified resource block allocation region for wireless relay 110. Donor base station 120 then exchanges second user data with wireless relay 110 using the reduced communication throughput.

FIG. 2 is a flow diagram illustrating an operation of wireless communication system 100 to notify a donor base station of the use of ICIC between a wireless relay and a neighboring base station. Donor base station 120 exchanges (201) first user data with wireless relay 110 using a standard communication throughput. Relay control system 130 exchanges (202) data with wireless relay 110 over donor base station 120 and neighboring base station 121. Relay control system 130 detects (203) ICIC between wireless relay 110 and neighboring base station 121. Relay control system 130 identifies (204) donor base station 120 serving wireless relay 110 and signals donor base station 120 of the ICIC between wireless relay 110 and neighboring base station 121. Donor base station 120 receives (205) the signaling and reduces (205) the standard communication throughput of wireless relay 110. Donor base station 120 then exchanges (206) second user data with wireless relay 110 using the reduced communication throughput.

FIG. 3 is a sequence diagram illustrating the operation of wireless communication system 100 to notify a donor base station of the use of ICIC between a wireless relay and a neighboring base station. Donor base station 120 exchanges first user data with wireless relay 110 using a standard communication throughput. For example, donor base station 120 may exchange user data for UE 101 using X2 data over an X2 interface.

Relay control system 130 exchanges data with wireless relay 110 over donor base station 120 and neighboring base station 121. Relay control system 130 detects ICIC between wireless relay 110 and neighboring base station 121. For example, relay control system 130 may scan for ICIC messaging on an X2 interface to detect the use of ICIC between wireless relay 110 and neighboring base station 121. Relay control system 130 then identifies donor base station 120 serving wireless relay 110 and signals donor base station 120 of the ICIC between wireless relay 110 and neighboring base station 121.

Donor base station 120 receives the signaling and reduces the standard communication throughput of wireless relay 110. For example, donor base station 120 may reduce a resource block allocation region previously used for wireless relay 110. Donor base station 120 then exchanges second user data with wireless relay 110 using the reduced communication throughput.

Figure 4:
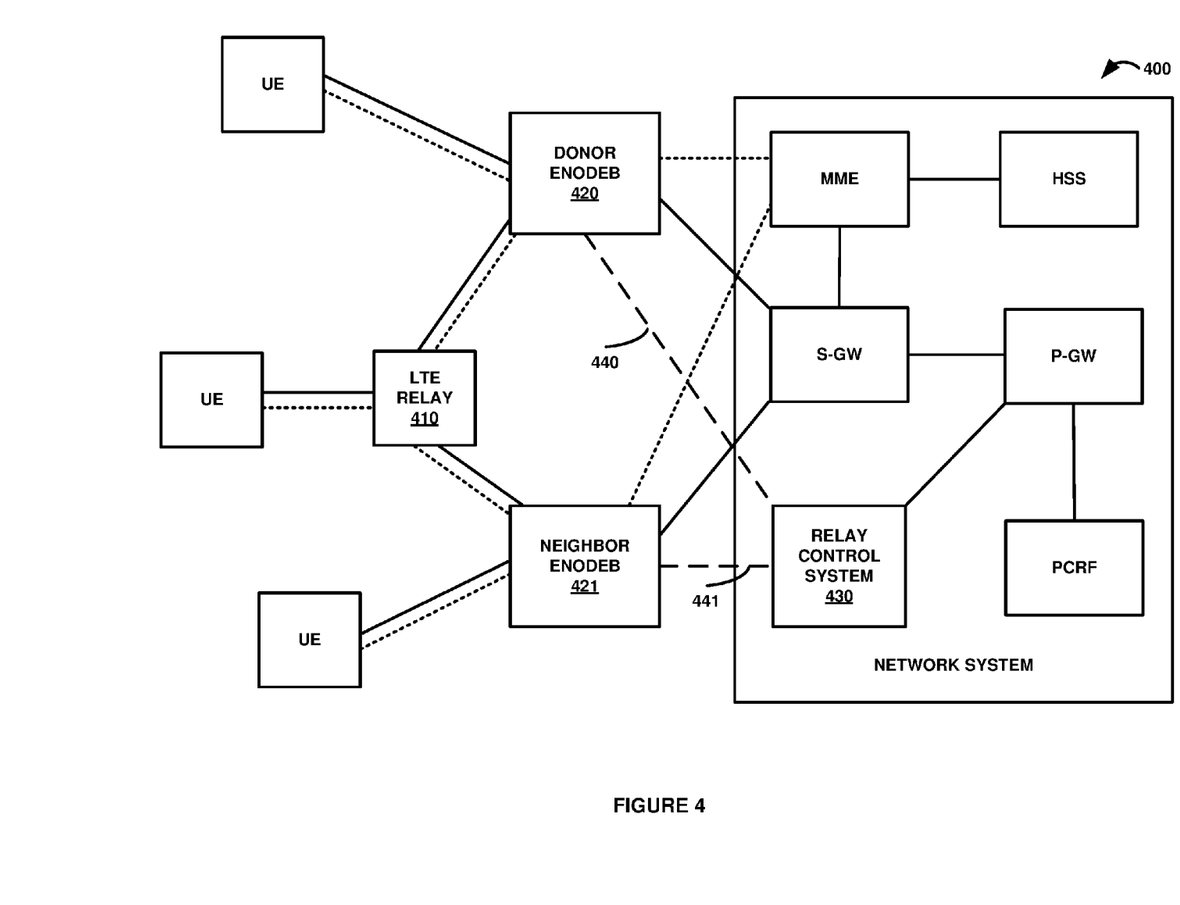
FIGS. 4-6 illustrate a Long Term Evolution (LTE) network to notify a donor base station of the use of ICIC between a wireless relay and a neighboring base station.
Figure 5:
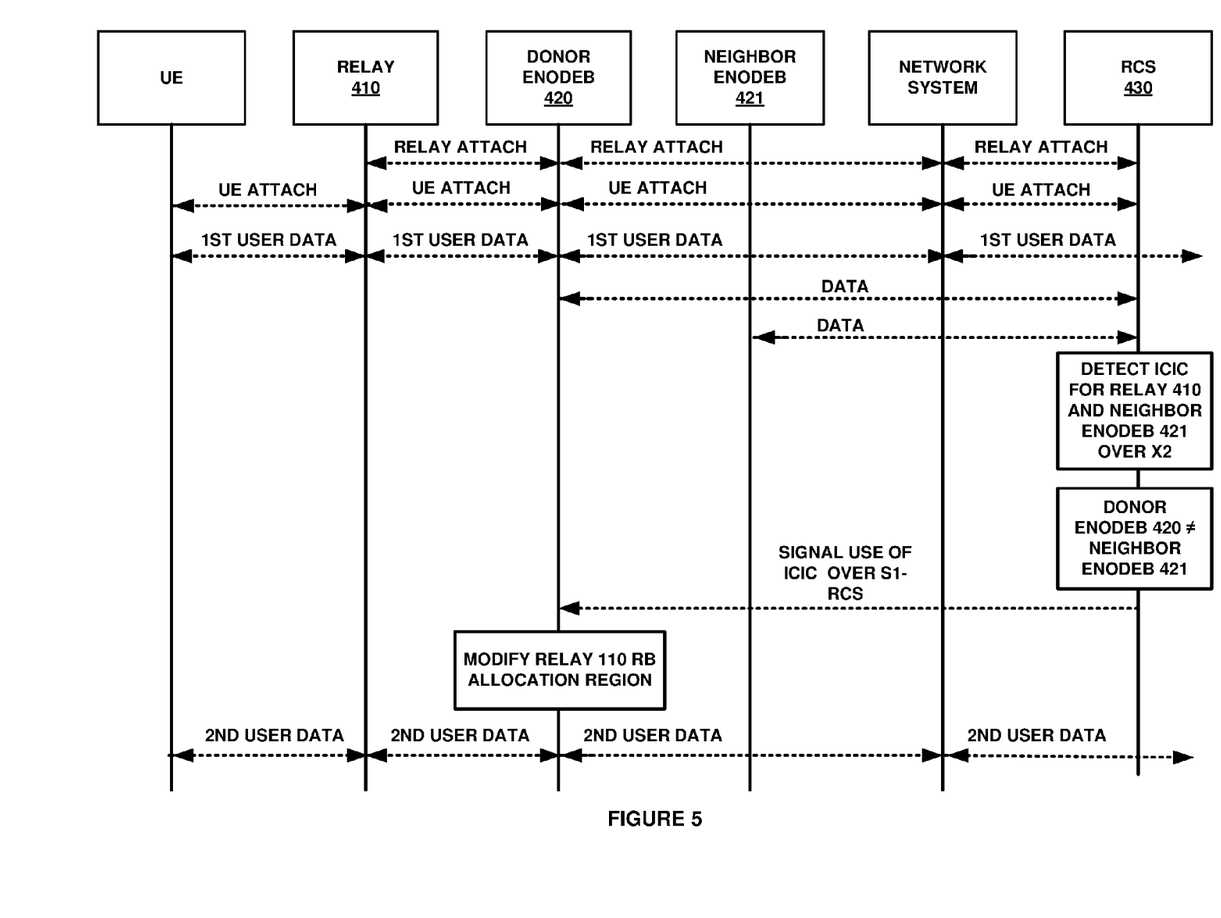
Figure 6:
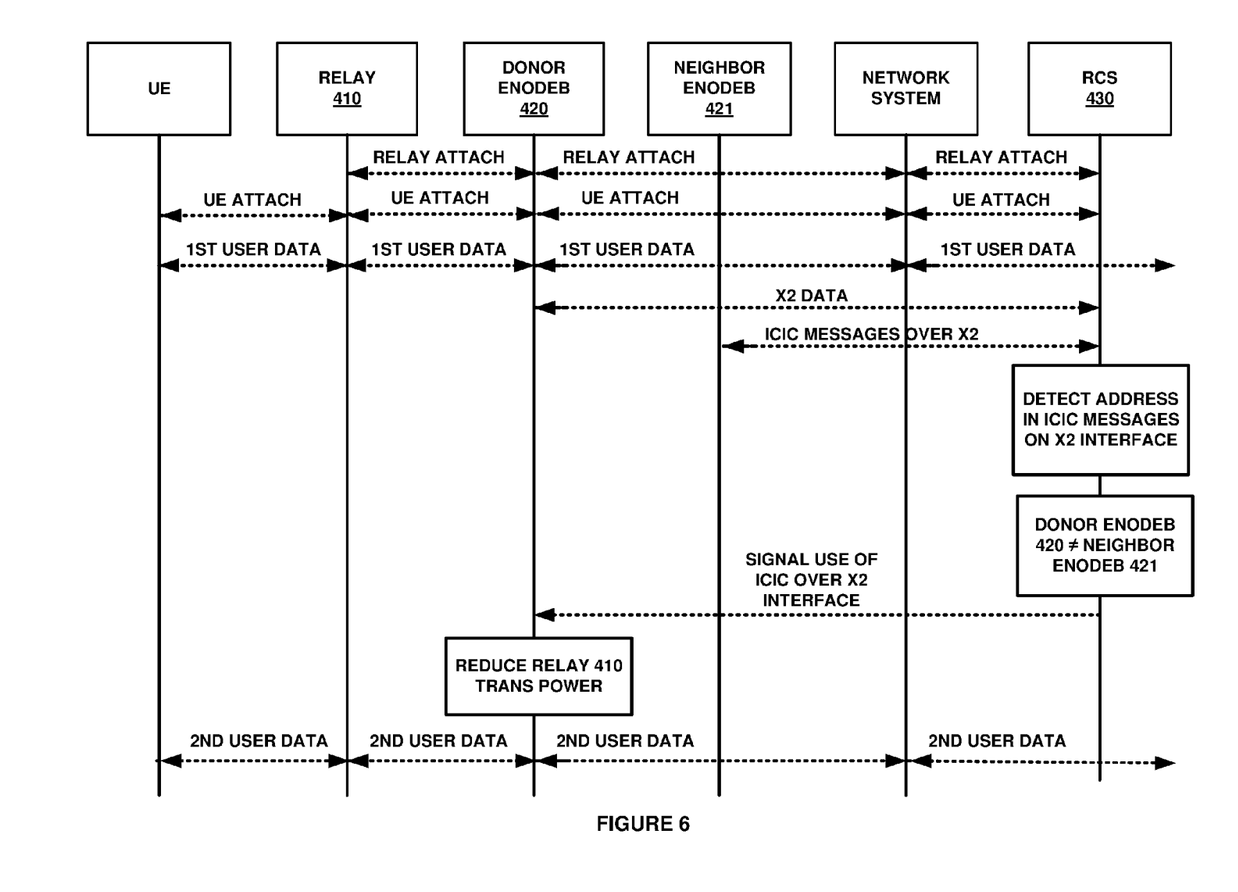

FIGS. 4-6 illustrate Long Term Evolution (LTE) communication system 400 to notify a donor base station of the use of ICIC between a wireless relay and a neighboring base station. Referring to FIG. 4, LTE communication system 400 is an example of communication system 100, although communication system 100 may use alternative configurations and operations. LTE communication system 400 includes UEs, LTE relay 410, donor eNodeB 420, neighboring eNodeB 421, and a network system. The network system includes relay control system 430, a Serving Gateway (S-GW), a Mobility Management Entity (MME), a Home Subscriber Server (HSS), a Packet Data Network Gateway (P-GW), and a Policy Charging Rules Function (PCRF).

As shown in FIG. 4, communication link 440 and communication link 441, illustrated by the dashed lines, show communication interfaces between relay control system 430 and donor eNodeB 420 and neighboring eNodeB 421. Communication links 440-441 may be a relay X2 interface link or an S1-RCS interface link. Other communication links include data links illustrated by solid lines and signaling links are illustrated by dotted lines.

Still referring to FIG. 4, the UEs exchange data and signaling with LTE relay 410, donor eNodeB 420, and neighbor eNodeB 421 over Radio Frequency (RF) communication links. LTE relay 410 communicates with donor eNodeB 420 and neighboring eNodeB 421 over an X2 interface link. Donor eNodeB 420 and neighboring eNodeB 421 communicate with the S-GW over an S1-U data link. Donor eNodeB 420 and neighboring eNodeB 421 communicate with the MME over an S1-MME signaling link. The MME and the HSS exchange data over a Diameter link. The S-GW and the P-GW communicate over an S5 or S8 data link. The P-GW and the PCRF exchange data over a Diameter link.

FIG. 5 illustrates an operation of LTE communication system 400 to notify a donor base station of the use of ICIC between a wireless relay and a neighboring base station. In operation, LTE relay 410 attaches to and registers with the network system and relay control system 430 over donor eNodeB 420. Wireless relay 410 may attach to and register with the network system by attaching to the MME and establishing a signaling bearer to relay control system 430. In other examples, relay control system 430 may comprise network elements, such as an MME. Therefore, wireless relay 410 may attach to relay control system 430 without attaching to the network system. Relay control system 430 may be located in a Network Functions Virtualization (NFV) system or within other network systems.

The UE then attaches to and registers with LTE communication network 400 over LTE relay 410, donor eNodeB 420, and the network system. Donor eNodeB 420 then exchanges first user data for the UE with LTE relay 410 using a standard resource block allocation region. At this point in the operation, relay control system 430 is exchanging data with LTE relay 410 over donor eNodeB 420 and neighboring eNodeB 421.

In a next operation, relay control system 430 detects the use of ICIC between LTE relay 410 and neighboring eNodeB 421 by detecting ICIC messages over the X2 interface between LTE relay 410 and neighboring eNodeB 421. In response, relay control system 430 identifies donor eNodeB 420 serving LTE relay 410 and determines whether donor eNodeB 420 is the same as neighbor eNodeB 421. In this example, donor eNodeB 420 and neighboring eNodeB 421 are not the same eNodeB. Therefore, relay control system 430 signals donor eNodeB 420 of the use of ICIC between LTE relay 410 and neighboring eNodeB 421 over S1-RCS signaling link 440.

Still referring to FIG. 5, donor eNodeB 420 receives the signaling from relay control system 430 over S1-RCS signaling link 440. Donor eNodeB 420 then reduces the standard resource block allocation region of LTE relay 410. Donor eNodeB 420 then exchanges second data with LTE relay 410 using the reduced resource block allocation region.

FIG. 6 illustrates an alternative operation of LTE communication system 400 to notify a donor base station of the use of ICIC between a wireless relay and a neighboring base station. In operation, LTE relay 410 attaches to and registers with relay control system 430 over donor eNodeB 420, the network system. The UE then attaches to and registers with LTE communication network 400 over LTE relay 410, donor eNodeB 420, the network system elements. Donor eNodeB 420 then exchanges first user data for the UE with LTE relay 410 using a standard transmission power level. At this point in the operation, relay control system 430 is exchanging data with LTE relay 410 over donor eNodeB 420 and neighboring eNodeB 421.

In a next operation, relay control system 430 detects the use of ICIC between LTE relay 410 and neighboring eNodeB 421 by detecting addresses in the ICIC messages on the X2 interface between LTE relay 410 and neighboring eNodeB 421. In response, relay control system 430 identifies donor eNodeB 420 serving LTE relay 410 and determines whether donor eNodeB 420 is the same as neighbor eNodeB 421. In this example, donor eNodeB 420 and neighboring eNodeB 421 are not the same eNodeB. Therefore, relay control system 430 signals donor eNodeB 420 of the use of ICIC between LTE relay 410 and neighboring eNodeB 421 over relay X2 signaling link 440.

Still referring to FIG. 6, donor eNodeB 420 receives the signaling from relay control system 430 over relay signaling link 440. Donor eNodeB 420 then reduces the transmission power level for LTE relay 410. Donor eNodeB 420 then exchanges second data with LTE relay 410 using the reduced transmission power level.

Figure 7:
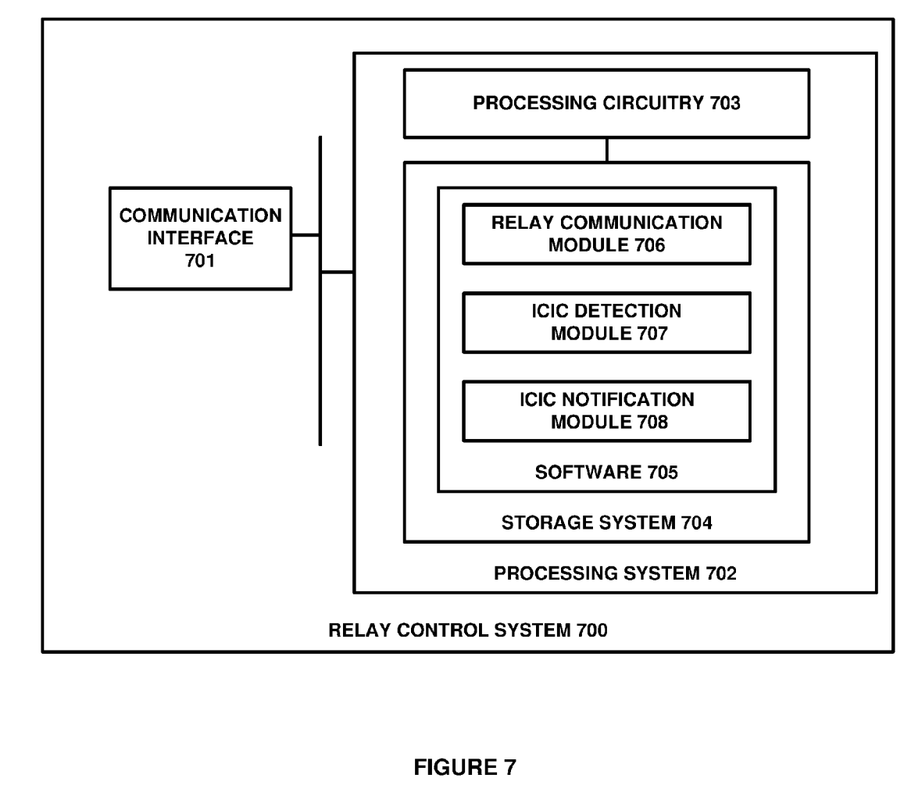
FIG. 7 illustrates a relay control system to notify a donor base station of the use of ICIC between a wireless relay and a neighboring base station.

FIG. 7 illustrates relay control system 700 to notify a donor base station of the use of ICIC between a wireless relay and a neighboring base station. Relay control system 700 is an example of relay control system 130 and relay control system 430, although relay control system 130 and relay control system 430 may use alternative configurations and operations. Relay control system 700 includes communication interface 701 and data processing system 702. Data processing system 702 is linked to communication interface 701.

Communication interface 701 comprises communication components, such as antennas, ports, amplifiers, filters, modulators, signal processors, and the like. Communication interface 701 may be configured to communicate over metallic, wireless, optical links, or some other communication media material. Communication interface 701 may be configured to use Time Division Multiplex (TDM), Internet Protocol (IP), Ethernet, optical networking, wireless protocols, communication signaling, or some other communication format—including combinations thereof. In particular, communication interface 701 may be configured to exchange data with a wireless relay over a donor base station and a neighboring base station. Communication interface 701 may further be configured to signal a donor base station of the ICIC between a wireless relay and a neighboring base station.

Data processing system 702 includes processing circuitry 703 and storage system 704 that stores software 705. Processing circuitry 703 comprises a microprocessor and other circuitry that retrieves and executes software 705 from storage system 704. Storage system 704 comprises a non-transitory storage medium, such as a disk drive, flash drive, data storage circuitry, or some other memory apparatus. Software 705 comprises computer programs, firmware, or some other form of machine-readable processing instructions. Software 705 may further include an operating system, utilities, drivers, network interfaces, applications, or some other type of software. When executed by processing circuitry 703, software 705 directs processing system 702 to operate relay control system 700 as described herein.

In particular, when executed by processing circuitry 703, relay communication module 706 directs processing circuitry 704 to exchange data with a wireless relay over a donor base station and a neighboring base station. When executed by processing circuitry 703, ICIC detection module 707 directs processing circuitry 703 to detect ICIC between a wireless relay and a neighboring base station. When executed by processing circuitry 703, ICIC notification module 708 directs processing circuitry 703 to identify a donor base station serving the wireless relay and signal the donor base station of the ICIC between the wireless relay and the neighboring base station.

Figure 8:
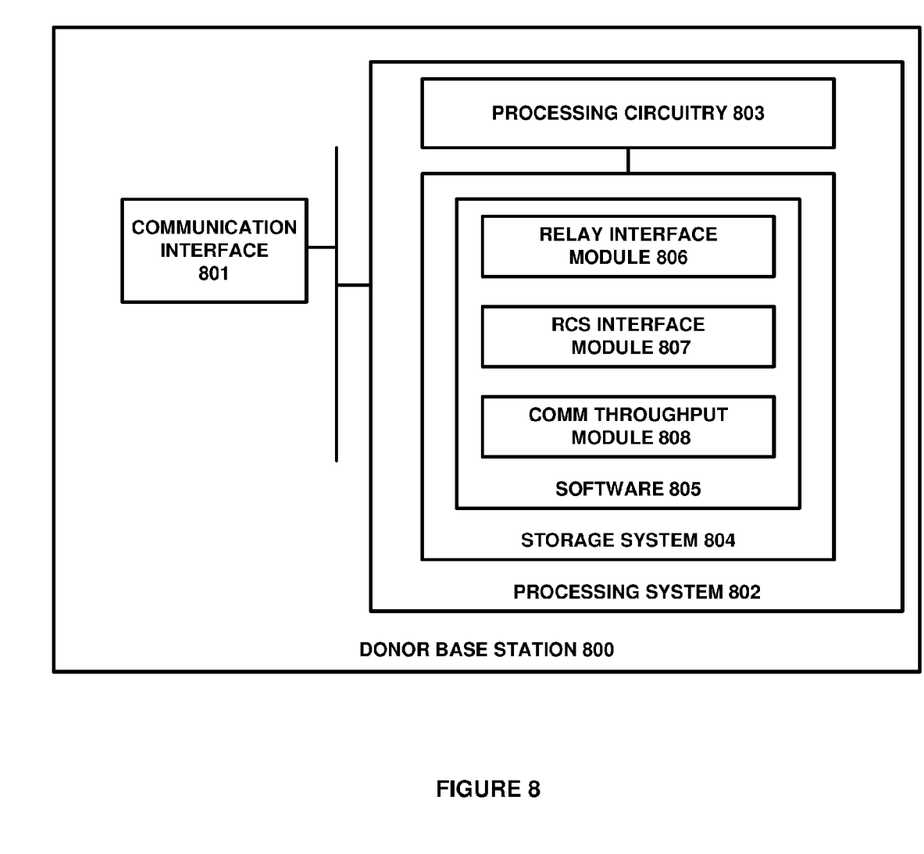
FIG. 8 illustrates a donor base station to reduce a standard communication throughput for a wireless relay.

FIG. 8 illustrates a donor base station to reduce a standard communication throughput for a wireless relay. Donor base station 800 is an example of donor base station 120 and donor eNodeB 420, although donor base station 120 and donor eNodeB 420 may use alternative configurations and operations. Donor base station 800 includes communication interface 801 and data processing system 802. Data processing system 802 is linked to communication interface 801.

Communication interface 801 comprises communication components, such as antennas, ports, amplifiers, filters, modulators, signal processors, and the like. Communication interface 801 may be configured to communicate over metallic, wireless, optical links, or some other communication media material. Communication interface 801 may be configured to use Time Division Multiplex (TDM), Internet Protocol (IP), Ethernet, optical networking, wireless protocols, communication signaling, or some other communication format—including combinations thereof. In particular, communication interface 801 may be configured to exchange data between a relay control system and a wireless relay.

Data processing system 802 includes processing circuitry 803 and storage system 804 that stores software 805. Processing circuitry 803 comprises a microprocessor and other circuitry that retrieves and executes software 805 from storage system 804. Storage system 804 comprises a non-transitory storage medium, such as a disk drive, flash drive, data storage circuitry, or some other memory apparatus. Software 805 comprises computer programs, firmware, or some other form of machine-readable processing instructions. Software 805 may further include an operating system, utilities, drivers, network interfaces, applications, or some other type of software. When executed by processing circuitry 803, software 805 directs processing system 802 to operate donor base station 800 as described herein.

In particular, when executed by processing circuitry 803, relay interface module 806 directs processing circuitry 804 to exchange data with a wireless relay using a standard communication throughput. When executed by processing circuitry 803, relay control system interface module 807 directs processing circuitry 803 to receive signaling from a relay control system indicating the use of ICIC between a wireless relay and a neighboring base station. When executed by processing circuitry 803, communication throughput module 808 directs processing circuitry 803 to reduce the standard communication throughput for the wireless relay and exchange additional data with the wireless relay using the reduced communication throughput.

Referring back to FIG. 1, UE 101 could be a phone, tablet computer, media device, or some other apparatus having a wireless LTE transceiver. UE 101 includes processing circuitry and memory that store and execute various software modules. UE 101 comprises communication transceivers, such as antennas, ports, bus interfaces, signal processors, memory, and software.

Wireless relay 110, donor base station 120, neighboring base station 121, and relay control system 130 each may include communication interfaces, network interfaces, processing systems, computer systems, microprocessors, storage systems, storage media, or some other processing devices or software systems, and may be distributed among multiple devices. In particular, wireless relay 110, donor base station 120, and neighboring base station 121 may be configured to provide wireless coverage to one or more UEs. Relay control system 130 is a control node within the wireless access network and is responsible for detecting the use of ICIC between wireless relay 110 and neighboring base station 121. Relay control system 130 may be located in a core wireless access network, in a separate NFV containing other network elements, or distributed among multiple networks.

Wireless links 140-141 may use air, space, or some other wireless material that transports media. Wireless links 140-141 may use protocols, such as LTE, Code Division Multiple Access (CDMA), Orthogonal Frequency Division Multiplexing Access (OFDMA), LTE Wireless Aggregation (LWA), Internet Protocol (IP), or some other wireless communication format—including combinations thereof.

Communication links 142-143 may use metal, glass, optics, air, space, or some other material as the transport media. Communication links 142-143 may use Time Division Multiplexing (TDM), IP, Ethernet, Synchronous Optical Networking (SONET), communication signaling, wireless communications, or some other communication format—including improvements thereof. Communication links 142-143 may be a direct link, or can include intermediate networks, systems, or devices, and can include a logical network link transported over multiple physical links.

The above descriptions and associated figures depict specific embodiments to teach those skilled in the art how to make and use the best mode of the invention. The following claims specify the scope of the invention. Note that some aspects of the best mode may not fall within the scope of the invention as specified by the claims. Those skilled in the art will appreciate variations from these embodiments that fall within the scope of the invention and that the features described above can be combined in various ways to form multiple embodiments. As a result, the invention is not limited to the specific embodiments described above, but only by the claims and their equivalents.

What is claimed is:

1. A method of operating a wireless communication network to notify a donor base station of the use of Inter-Cell Interference Coordination (ICIC) between a wireless relay and a neighboring base station, the method comprising:

the donor base station exchanging first user data with the wireless relay using a first communication throughput;

a relay control system exchanging data with the wireless relay over the donor base station and the neighboring base station;

the relay control system detecting ICIC between the wireless relay and the neighboring base station and in response, identifying the donor base station serving the wireless relay and signaling the donor base station of the ICIC between the wireless relay and the neighboring base station; and the donor base station receiving the signaling and responsively reducing the first communication throughput of the wireless relay; and the donor base station exchanging second data with the wireless relay using the reduced communication throughput.

2. The method of claim 1 wherein the relay control system exchanging data between the donor base station and the neighboring base station comprises the relay control system exchanging X2 data between the donor base station and the neighboring base station over an X2 interface.

3. The method of claim 1 wherein the relay control system detecting ICIC between the wireless relay and the neighboring base station comprises the relay control system scanning for ICIC messaging on an X2 interface.

4. The method of claim 1 wherein the relay control system detecting ICIC between the wireless relay and the neighboring base station comprises the relay control system scanning for relay to base station addressing in ICIC messaging on an X2 interface.

5. The method of claim 1 wherein the relay control system identifying the donor base station serving the wireless relay comprises the relay control system determining if the donor base station serving the wireless relay is the neighboring base station.

6. The method of claim 1 wherein the wireless relay system identifying the donor base station serving the wireless relay and signaling the donor base station of the ICIC between the wireless relay and the neighboring base station comprises the wireless relay determining if the donor base station serving the wireless relay is the neighboring base station and if the donor base station is not the neighboring base station, then signaling the donor base station of the ICIC between the wireless relay and the neighboring base station.

7. The method of claim 1 wherein the relay control system signaling the donor base station comprises the relay control system signaling the donor base station over an X2 interface between the relay control system and the donor base station.

8. The method of claim 1 wherein the relay control system signaling the donor base station comprises the relay control system signaling the donor base station over an S1-Relay Control System (RCS) interface between the relay control system and the donor base station.

9. The method of claim 1 wherein the donor base station reducing the first communication throughput of the wireless relay comprises the donor base station transferring an instruction to the wireless relay indicating a modified resource block allocation region for the wireless relay.

10. The method of claim 1 wherein the relay control system exchanging data with the wireless relay over the donor base station and the neighboring base station comprises the relay control system exchanging data with a plurality of wireless relays over a plurality of base stations.

11. A wireless communication network to notify a donor base station of the use of Inter-Cell Interference Coordination (ICIC) between a wireless relay and a neighboring base station, the wireless communication network comprising:

the donor base station configured to exchange first user data with the wireless relay using a first communication throughput;

a relay control system configured to exchange data with the wireless relay over the donor base station and the neighboring base station;

the relay control system configured to detect ICIC between the wireless relay and the neighboring base station and in response, identify the donor base station serving the wireless relay and signal the donor base station of the ICIC between the wireless relay and the neighboring base station; and the donor base station configured to receive the signaling and responsively reduce the first communication throughput of the wireless relay; and the donor base station configured to exchange second data with the wireless relay using the reduced communication throughput.

12. The wireless communication network of claim 11 wherein the relay control system configured to exchange data between the donor base station and the neighboring base station comprises the relay control system configured to exchange X2 data between the donor base station and the neighboring base station over an X2 interface.

13. The wireless communication network of claim 11 wherein the relay control system configured to detect ICIC between the wireless relay and the neighboring base station comprises the relay control system configured to scan for ICIC messaging on an X2 interface.

14. The wireless communication network of claim 11 wherein the relay control system configured to detect ICIC between the wireless relay and the neighboring base station comprises the relay control system configured to scan for relay to base station addressing in ICIC messaging on an X2 interface.

15. The wireless communication network of claim 11 wherein the relay control system configured to identify the donor base station serving the wireless relay comprises the relay control configured to determine if the donor base station serving the wireless relay is the neighboring base station.

16. The wireless communication network of claim 11 wherein the wireless relay system configured to identify the donor base station serving the wireless relay and signal the donor base station of the ICIC between the wireless relay and the neighboring base station comprises the wireless relay configured to determine if the donor base station serving the wireless relay is the neighboring base station and if the donor base station is not the neighboring base station, then to signal the donor base station of the ICIC between the wireless relay and the neighboring base station.

17. The wireless communication network of claim 11 wherein the relay control system configured to signal the donor base station comprises the relay control system configured to signal the donor base station over an X2 interface between the relay control system and the donor base station.

18. The wireless communication network of claim 11 wherein the relay control system configured to signal the donor base station comprises the relay control system configured to signal the donor base station over an S1-Relay Control System (RCS) interface between the relay control system and the donor base station.

19. The wireless communication network of claim 11 wherein the donor base station configured to reduce the first communication throughput of the wireless relay comprises the donor base station configured to transfer an instruction to the wireless relay indicating a modified resource block allocation region for the wireless relay.

20. The wireless communication network of claim 11 wherein the relay control system configured to exchange data with the wireless relay over the donor base station and the neighboring base station comprises the relay control system configured to exchange data with a plurality of wireless relays over a plurality of base stations.

* * * * *